United States Patent
Hirth et al.

(10) Patent No.: US 8,342,572 B2
(45) Date of Patent: Jan. 1, 2013

(54) SUPPORT STRUCTURE FOR AN AIRBAG

(75) Inventors: Andreas Hirth, Dielheim (DE); Lutz Quarg, Boeblingen (DE); Friedrich Reiter, Sindelfingen (DE); Clark Ruedebusch, Holzgerlingen (DE)

(73) Assignee: Daimler AG, Stuttgart (DE)

( * ) Notice: Subject to any disclaimer, the term of this patent is extended or adjusted under 35 U.S.C. 154(b) by 90 days.

(21) Appl. No.: 12/740,863

(22) PCT Filed: Sep. 25, 2008

(86) PCT No.: PCT/EP2008/008123
§ 371 (c)(1),
(2), (4) Date: Jul. 15, 2010

(87) PCT Pub. No.: WO2009/056201
PCT Pub. Date: May 7, 2009

(65) Prior Publication Data
US 2010/0276918 A1    Nov. 4, 2010

(30) Foreign Application Priority Data
Nov. 2, 2007   (DE) .......................... 10 2007 052 247

(51) Int. Cl.
*B60R 21/26*   (2006.01)
*B60R 21/231*  (2006.01)
(52) U.S. Cl. ..................... 280/743.1; 280/729; 280/742
(58) Field of Classification Search .................. 280/729, 280/730.2, 736, 740, 742, 743.1
See application file for complete search history.

(56) References Cited

U.S. PATENT DOCUMENTS

| | | | |
|---|---|---|---|
| 3,784,225 A | 1/1974 | Fleck et al. | |
| 3,843,150 A | 10/1974 | Harada et al. | |
| 3,960,386 A | 6/1976 | Wallsten | |
| 3,970,328 A * | 7/1976 | Wallsten | 280/731 |
| 4,076,277 A * | 2/1978 | Kuwakado et al. | 280/738 |
| 4,500,114 A * | 2/1985 | Grey, Jr. | 280/742 |
| 5,542,695 A | 8/1996 | Hanson | |
| 6,402,191 B1 | 6/2002 | Sinnhuber | |
| 6,439,605 B2 * | 8/2002 | Ariyoshi | 280/739 |
| 6,616,179 B2 * | 9/2003 | Tanase et al. | 280/730.2 |
| 7,021,652 B2 * | 4/2006 | Kumagai et al. | 280/729 |
| 7,264,268 B2 * | 9/2007 | Ehrke | 280/729 |
| 7,448,645 B2 * | 11/2008 | Bederka et al. | 280/730.2 |
| 7,552,942 B2 * | 6/2009 | Fischer et al. | 280/743.2 |

(Continued)

FOREIGN PATENT DOCUMENTS

DE    2 406 501    8/1974

(Continued)

OTHER PUBLICATIONS

Guthke et al., Safety Device, Nov. 17, 2004, EPO, EP 1 477 372 A1, Machine Translation of Description.*

(Continued)

*Primary Examiner* — Joseph Rocca
*Assistant Examiner* — James English
(74) *Attorney, Agent, or Firm* — Crowell & Moring LLP

(57) ABSTRACT

A support structure for a vehicle airbag that can be displaced from a storage position to a restraint position by a gas flow, comprises a plurality of hollow bodies that are connected to each other to form a channel system. A device is provided inside the channel system for the targeted influencing of the gas flow.

15 Claims, 4 Drawing Sheets

U.S. PATENT DOCUMENTS

| | | | |
|---|---|---|---|
| 7,618,061 B2 * | 11/2009 | Eckelberg | 280/743.2 |
| 7,926,838 B2 * | 4/2011 | Honda et al. | 280/729 |
| 2003/0141710 A1 | 7/2003 | Zahn et al. | |
| 2004/0174003 A1 | 9/2004 | Dominissini | |
| 2005/0062268 A1 * | 3/2005 | Inoue et al. | 280/730.2 |
| 2006/0197320 A1 * | 9/2006 | Abe | 280/729 |
| 2007/0252367 A1 * | 11/2007 | Zhong et al. | 280/729 |
| 2009/0322062 A1 * | 12/2009 | Bauer et al. | 280/729 |
| 2010/0327568 A1 * | 12/2010 | Baumann et al. | 280/743.1 |
| 2011/0049846 A1 * | 3/2011 | Hirth et al. | 280/729 |
| 2011/0248487 A1 * | 10/2011 | Burczyk et al. | 280/742 |

FOREIGN PATENT DOCUMENTS

| | | |
|---|---|---|
| DE | 198 22 227 A1 | 11/1999 |
| EP | 1 340 656 A2 | 9/2003 |
| EP | 1 477 372 A1 | 11/2004 |
| JP | 2002-515370 A | 5/2002 |
| JP | 2003-54348 A | 2/2003 |
| JP | 2003-523882 A | 8/2003 |
| WO | WO 2006/061131 A1 | 6/2006 |
| WO | WO 2007/045952 A1 | 4/2007 |

OTHER PUBLICATIONS

Corresponding German Office Action dated Sep. 16, 2008 (Four (4) pages).

International Search Report dated Jan. 7, 2009 (Form PCT/ISA/210) with English Translation, along with Form PCT/ISA/220 and Form PCT/ISA/237 (Eighteen (18) pages).

* cited by examiner

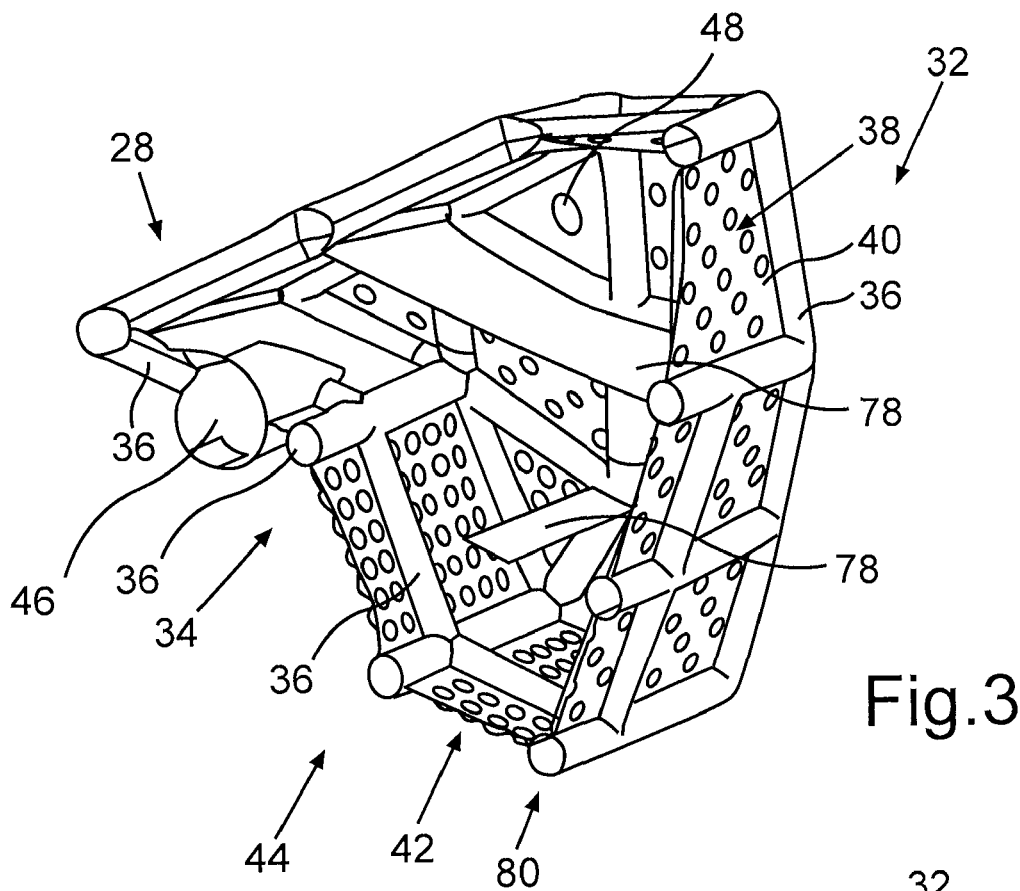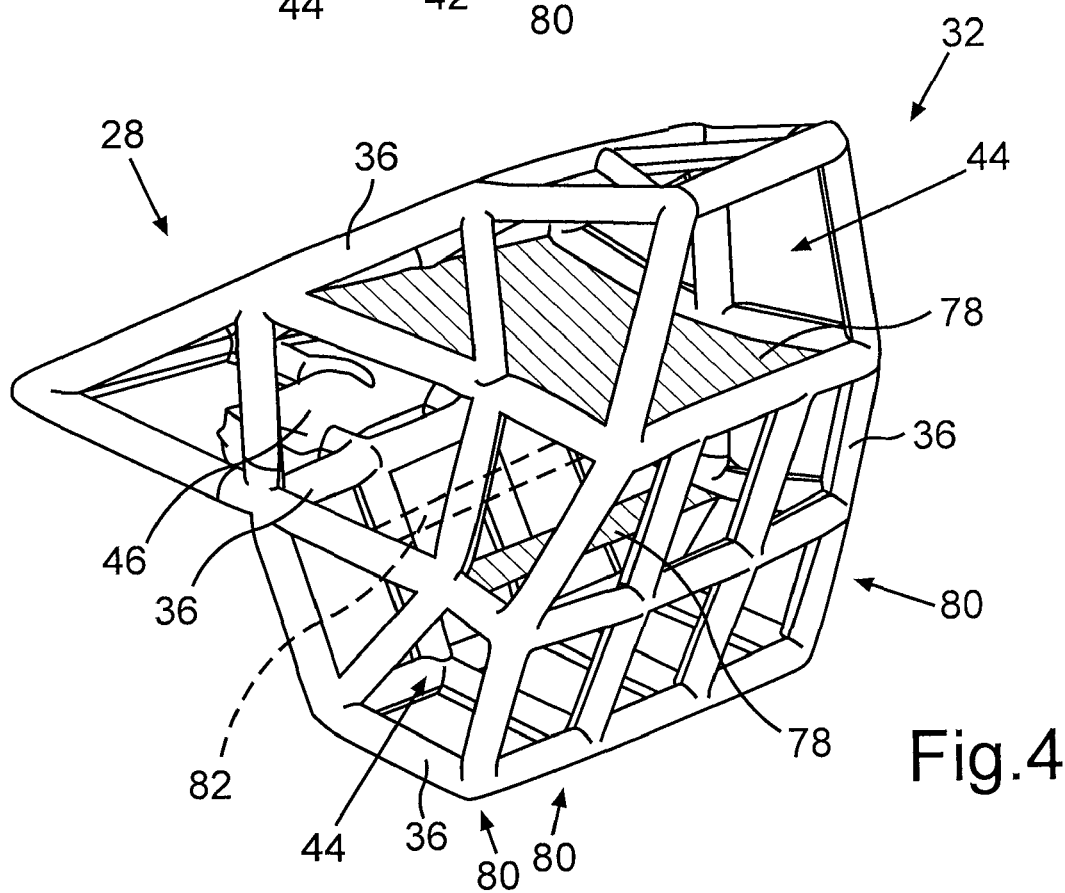

SUPPORT STRUCTURE FOR AN AIRBAG

This application is a national stage of PCT International Application No. PCT/EP2008/008123, filed Sep. 25, 2008, which claims priority under 35 U.S.C. §119 to German Patent Application No. 10 2007 052 247.0, filed Nov. 2, 2007, the entire disclosure of which is herein expressly incorporated by reference.

BACKGROUND AND SUMMARY OF THE INVENTION

The invention relates to a support structure for vehicle airbag.

Such airbags are known from the series-production of motor vehicles, especially of passenger vehicles. After having been used initially in particular to protect the driver or the passenger, for some years they have also been used widely as lateral airbags in the region of the side doors, as head airbags in the region of the lateral glazing or at another location within the motor vehicle.

A particular ambition with the development of airbags is thereby amongst others to arrange the airbag in its restraint position as large and as optimal as possible, so that it has a beneficial restraint effect. Additionally, it shall be achieved by a beneficial OoP behavior (out of position) of the airbag that a vehicle occupant is held back even with a poor or unusual sitting posture in the case of a collision, without experiencing unnecessary loads by the airbag itself. A deployment behavior of the airbag to the restraint position shall be achieved by a beneficial LRD behavior (low risk development), by means of which the seat occupant is affected in a correspondingly low manner.

It is thus an object of the present invention to create a support structure for an airbag of the type mentioned at the outset, by means of which the protective properties of the airbag can be improved further.

This and other objects and advantages are achieved by the support structure according to the invention, which can be moved or enlarged from a storage position to a restraint position by a gas flow, and which comprises a plurality of hollow bodies connected to each other that form a channel system, with means being provided for the targeted influencing of the gas flow are provided within the channel system. In other words, a framework- or frame-like support structure is for example presently provided in the restraint position, which consists of a plurality of hollow bodies—for example tube bodies. The latter are connected with to each other in a gas-guiding channel system. To improve the protective function of the airbag in a targeted manner, means are provided within the channel system for the targeted influencing of the gas flow, by means of which for example the filling time, the filling sequence, the deployment behavior, the OoP behavior and the LRD behavior of the support structure or of the airbag can be influenced in a targeted manner. It can be seen that these measures all serve for the improved protective function of the airbag.

By the targeted influencing of the gas flow, it can thereby be achieved for example that individual partial regions of the support structure are supplied in a temporally different manner or with different pressure. It is thereby possible, for example, to achieve targeted movement or deployment shapes of the support structure or of the airbag. By the targeted influencing of the gas flow by effecting a different pressure, the restraining effect of the support structure can also be influenced.

The support structure itself is preferably surrounded by a casing or the like, so that ambient air enclosed within the support structure can be consulted for the restraining effect. This takes place, for example, in that, during the impact of the seat occupant on the airbag in the restraint position, the internal pressure is built up within the support structure provided with the covering, whereby the restraint results. It is thereby of particular importance that the pressure builds up in the volume enclosed within the support structure as efficiently as possible.

In a further arrangement of the invention, it has further been shown to be advantageous if at least one guide element is arranged within the channel system, by means of which the gas flow shall be guided. It is thus possible in a simple manner during the deployment or moving of the airbag to the restraint position, to carry out for example a division of the gas flow between individual hollow bodies or partial regions of the channel system. Depending on how far the guide surface projects into a corresponding hollow body, a volume flow can thus be determined, which shall further flow in one direction or the other. Altogether, a simple possibility for the targeted influencing of the gas flow is thus created.

In a further development of the invention, the at least one guide element is provided in the region of a connection of two hollow bodies of the channel system in a preferred manner, so as to thus carry out in an indirect manner a division of two partial gas flows between two partial gas flows, which are to be guided to the respective hollow bodies.

In a further advantageous embodiment, it is provided that at least one closure element is arranged within the channel system, for closing an associated hollow body. A flow in a corresponding hollow body or of a partial region of the support structure can thus be avoided or stopped in a targeted manner, wherein a deflection of the gas flow to another partial region of the support structure can be realized by this closure. It is obvious that the sequence or the deployment behavior of the support structure or of the airbag can again be influenced hereby in a targeted manner. A stopping or deflection of the gas flow for influencing the filling sequence is hereby possible.

In a further arrangement of the invention, it is provided that at least one cross sectional change of an associated hollow body is provided within the channel system. This cross sectional change can thereby be provided in an extremely localized or partial manner, or can also take place over longer path progressions of the hollow body. By this measure, the flow resistance within the respective hollow body or the respective partial region of the support structure can be adapted correspondingly to the appropriate distribution. In other words, the flow behavior of the gas flow can be influenced correspondingly by the targeted cross sectional change, so as to for example generate a corresponding filing sequence or a corresponding deployment behavior. The targeted cross sectional change of the associated hollow body can also be used for influencing the flow and/or pressure ratios in the hollow bodies, in order to for example cause or avoid constrictions in a targeted manner, which can be caused by the Bernoulli effect.

It has further been shown to be advantageous if at least one valve is arranged within the channel system as a means for influencing the gas flow, by means of which valve the gas flow can be adjusted. A membrane functioning in the same manner would naturally also be conceivable instead of a valve. By means of such a valve it is thus possible to adjust a different pressure in individual hollow body sections or partial regions of the channel system. It is thereby for example possible to use part of the gas filling or of the gas flow for filling and heating the restraint volume, while another part remains in the support structure or in the channel system, so as to achieve a restraint effect or re-establishment of the restraint volume. With a labyrinth and/or obstacle construction which can be generated thereby, the deployment sequence and speed can be controlled correspondingly. In a further arrangement of the invention, the at least one valve can thereby also be formed as a check valve.

In a further development of the invention, it is additionally provided that at least one closure element is arranged within the channel system, by means of which an associated hollow body can be closed. It would thereby be particularly conceivable to use a flap or the like instead of a valve, by means of which a gas flow can flow through the hollow body in one direction, but not in the other direction.

It has finally been shown to be advantageous in a further embodiment of the invention if at least one hollow body of the channel system has a nominal bending location. The OoP behavior and the LRD behavior can also be influenced hereby in a beneficial manner.

This is especially characterized in that a plurality of hollow bodies are provided, which are connected to each other, that form a channel system, wherein a plurality of the hollow bodies forms an outer structure of the support structure, and wherein at least one hollow body is provided, by means of which hollow bodies of the outer structure are connected to each other. Accordingly, at least one hollow body is provided, which not only proceeds at the outer surface or surface of the support structure, but also through its restraint volume. Hereby, corresponding partial regions of the outer structure of the support structure can be connected to each other in a suitable manner, so as to optimize the deployment and possibly also the support behavior of the support structure or of the airbag. Thus, a shortcut can be created by means of the hollow body projecting through the restraint volume so as to optimize the deployment and the support behavior of the support structure or of the airbag. Furthermore, the at least one hollow body, which passes through the restraint volume, can be used for the supporting or stiffening of the support structure or of the airbag.

It has finally been shown to be advantageous if a gas generator which generates the gas flow is connected to a plurality of hollow bodies, so as to achieve a fast distribution of the medium within the channel system.

Other objects, advantages and novel features of the present invention will become apparent from the following detailed description of the invention when considered in conjunction with the accompanying drawings.

BRIEF DESCRIPTION OF THE DRAWINGS

FIG. 3 is a perspective sectional view through the support structure and the airbag according to FIG. 2, along a vertical sectional plane in the longitudinal vehicle direction;

FIG. 4 is a perspective view of the support structure for the airbag according to FIG. 2, wherein, in contrast to this, the planar elements of the covering which fill the compartments of the support structure of the restraint volume of the airbag are omitted;

DETAILED DESCRIPTION OF THE DRAWINGS

Figure 1:
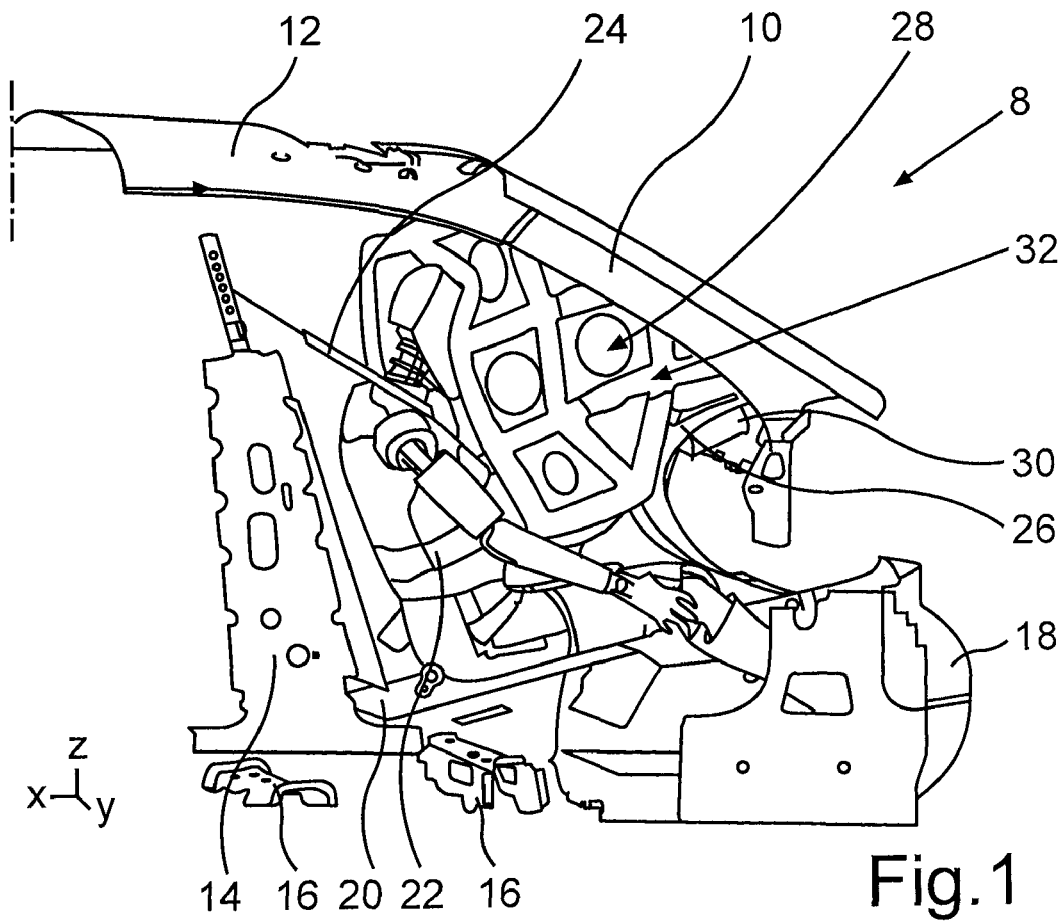
FIG. 1 is a partial side view of a passenger cell of a passenger motor vehicle with a seat occupant positioned on a front passenger seat, who has been dislocated in the longitudinal vehicle direction forward due to a collision of the passenger motor vehicle, and is restrained by a passenger airbag that has been displaced from a storage position within a dashboard of the passenger motor vehicle to a restraint position, wherein the airbag comprises a support structure, which comprises a plurality of hollow bodies connected to each other to form a channel system, and wherein the support structure has been moved from the storage position to the restraint position by means of a gas flow from a gas generator.

FIG. 1 is a partial schematic side view of a passenger cell 8 of a passenger motor vehicle. An A pillar 10 can especially be recognized thereby, which passes into a roof frame 12 on the upper side. Furthermore, a B pillar 14, two transverse seat beams 16 which extend between a center tunnel (not shown) and a side sill, (also not shown) and an a front wall 18 (shown in parts), which limits the passenger cell 8 to the front, can be seen.

A passenger seat 20 can be seen in parts from the interior of the passenger motor vehicle, on which seat the passenger is positioned. The seat occupant 22 is positioned by being strapped in by a safety belt 24.

Furthermore, a dashboard 26 can be seen in parts, from which a passenger airbag 28, to be shown in more detail in the following, has been moved or enlarged from a storage position, in which it is arranged in an airbag module 30 within the dashboard 26, to a restraint position shown here. Accordingly, an accident scenario is shown in FIG. 1, in which the seat occupant 22 has already been dislocated forward from the vehicle seat 20 and is already partially restrained by the airbag 28, which has been deployed or enlarged from the storage position to the restraint position by means of a corresponding sensor system.

Figure 2:
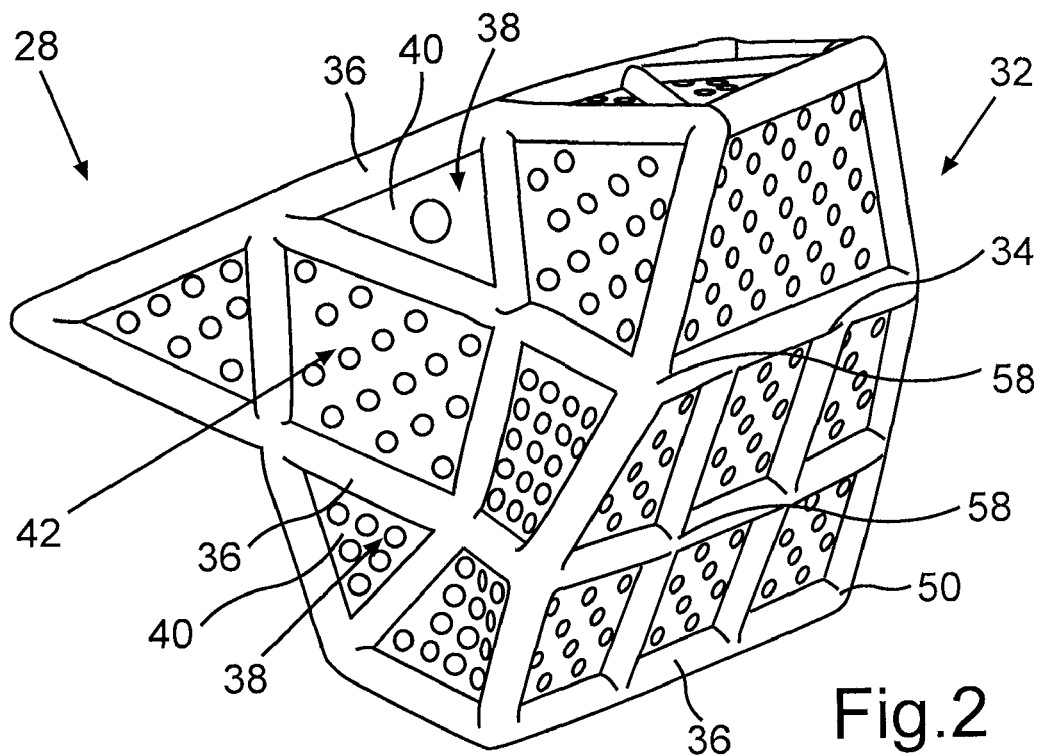
FIG. 2 is a perspective of the support structure for the airbag according to FIG. 1, in its deployed or enlarged retaining position, including a plurality of hollow bodies connected to each other that form the channel system, which hollow bodies are arranged in a framework manner, wherein the individual compartments of the framework are closed by respective planar elements of a covering, which encloses the restraint volume enclosed by the support structure.

In conjunction with FIG. 2, which shows the airbag 28 in its completely deployed restraint position, it can be seen that this comprises a support structure 32, which is created by a plurality of hollow bodies 36 connected to each other that form a channel system 34. The hollow bodies 36 are thereby presently designed as hose-type tube bodies, which are connected to each other as a framework-type or frame-type channel system 34. The hollow bodies 36 thereby presently consist of a flexible hose material to be filled with gas.

The hollow bodies 36 connected to each other in a framework manner, by individual compartments of the support structure are thus created, which are filled by planar elements 40. These planar elements 40 consist of a flexible material, for example a fabric or rubber material. The planar elements 40 form a covering 42 altogether, by means of which a restraint volume 44 is enclosed which is enclosed by the support structure 32.

This can especially also be seen in FIG. 3, which shows the airbag 28 with the support structure 32 and the covering 42 in a perspective sectional view along a vertical sectional plane in the longitudinal vehicle direction. It can be seen in particular thereby that the hollow bodies 36 are designed as tube or hose elements, which form the channel system 34 amongst each other.

A number of the hollow bodies 36 is thereby connected to a gas generator 46, by means of which a gas flow can be generated in the case of a collision of the motor vehicle, which flows into the channel system 34 of the support structure 32. The support structure 32 or the airbag 28 is thereby altogether moved from the airbag module 30 or the dashboard 26 from its storage position to its restraint position. In other words, the individual hollow bodies 36 of the channel system 64 are inflated or unfolded by the gas flow. The planar elements 40 of the covering 42 of the airbag are also deployed in conjunction with this enlargement or deployment of the support structure 32, so as to fill the corresponding compartments 38 or to limit the restraint volume 44 of the airbag 28 to the outside.

By the corresponding activation of the gas generator 46, a gas flow is generated thus, whereby the support structure 32 is deployed. Simultaneously therewith, the restraint volume 44 limited by the support structure 32 or the covering 42 is mounted thereby, which is filled with ambient air in one embodiment, which is present at ambient pressure. This can for example take place in that corresponding openings 48 within the covering 42 or the planar elements 40 are provided. The inner pressure of the covering 42 is in this case in principle rather smaller than with conventional airbags. This inner pressure increases however for the restraint, if the seat occupant 22—as shown in FIG. 1—moves into the airbag 28 by forward dislocation. By the volume reduction resulting in such a manner, the inner pressure within the covering 42 of the restraint volume 44 increases, whereby a restraint of the seat occupant 22 is generated. It is thereby particularly important that this pressure build-up for the restraint takes place as efficiently as possible.

It has to be considered within the scope of the invention that gas from the gas generator could also flow into the restraint volume 44 or the covering 42, so as to increase the inner pressure of the airbag hereby.

In order to achieve a particularly beneficial positioning and a particularly beneficial OoP behavior or an advantageous LRD behavior, means to be explained in more detail for the targeted influencing or interruption of the gas flow generated by the gas generator 48 in the case of a collision are further provided in the channel system 34.

Figure 5:
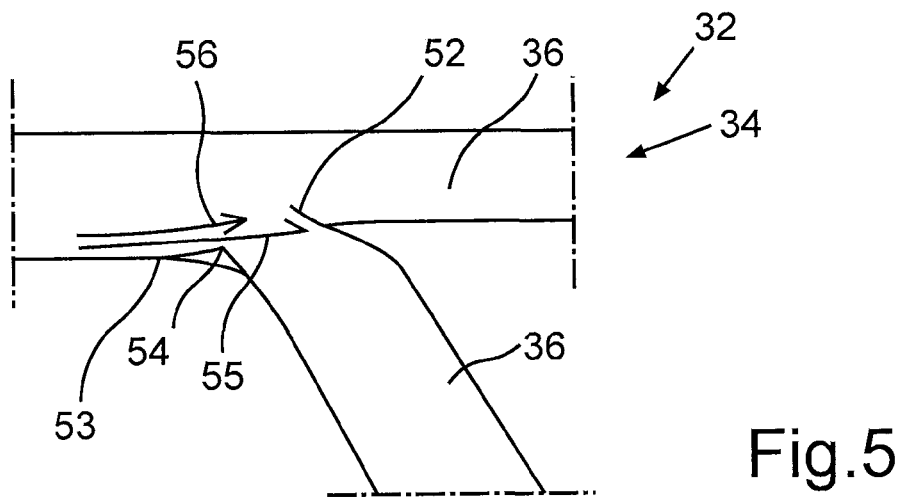
FIG. 5 is a schematic sectional view of a connection location of two hollow bodies of the channel system of the support structure, wherein a guide element is provided in the region of a connection location of the two hollow bodies, by means of which guide element a gas flow can be influenced in a targeted manner.

In FIG. 5, a branching point or a connection location 50 can hereby be seen between two hollow bodies 36, whose region is provided as a guide element 52 in the form of a corresponding wall projecting diagonally. A further guide element 54 is formed as an edge projecting from the associated wall 53. It is achieved by the guide element 52 that a gas flow indicated by the arrow 55 reaches the corresponding one hollow body 36, while a partial gas flow indicated by the arrow 56, which was correspondingly deflected by the guide element 54, passes around the guide element 52 and reaches the corresponding other hollow body 36. A targeted division of the partial gas flows can thus be achieved by the guide elements 52, 54, so as to hereby influence the deployment behavior, the filling sequence, the OoP behavior and the LRD behavior in a positive manner.

Figure 6:
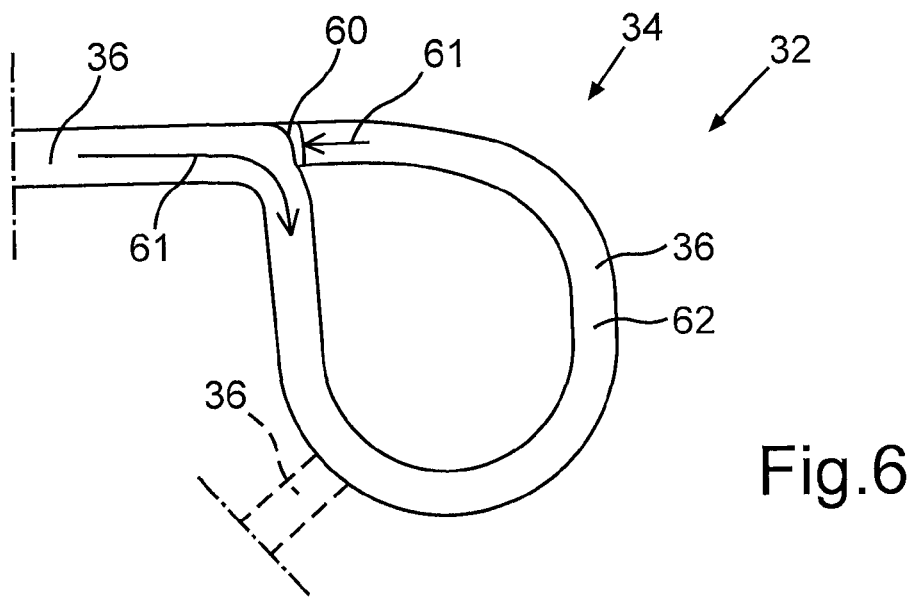
FIG. 6 is a further schematic sectional view through the channel system of the support structure, wherein a closure element is provided within the hollow body, by means of which closure element the hollow body can be closed or is closed.

FIG. 6 shows corresponding hollow bodies 36 of the channel system 34 in a further schematic sectional view in parts, wherein a closure element 60 is arranged in the region of a branching point 58, which is for example formed as a flap there. It is the specialty in the present embodiment that the closure element 60 is closed by the gas flow indicated by the arrow 61, which reaches the rear side of the closure element 60 via a corresponding loop 62. After the closure element 60 is closed, the gas flow can then for example flow into a further hollow body 36, which is only indicated with dashed lines. It would simultaneously naturally also be conceivable that a further flow of the gas flow is no longer possible after the closure of the closure element 60. It is thus possible for example to stop the gas flow correspondingly by means of such a closure element 60, so that it can be deflected in a targeted manner. By such stopping and/or deflection of the gas flow, a targeted influencing of the filling sequence and of the deployment behavior can be effected.

Figure 7:
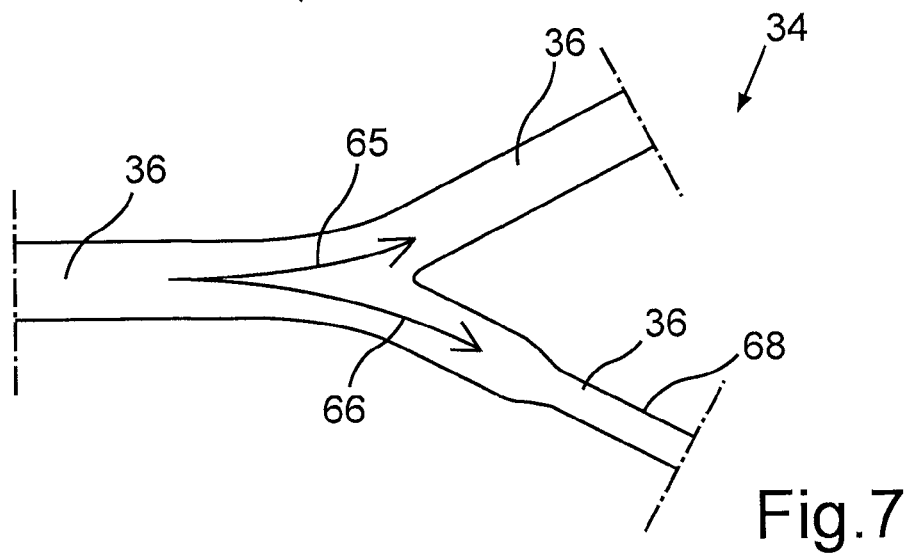
FIG. 7 is a schematic sectional view and in parts through the channel system of the support structure, wherein a branching between two hollow bodies can be seen, of which one hollow body has a cross sectional change in the form of a cross sectional reduction, whereby a targeted influencing of the gas flow which flows into the two hollow bodies takes place.

In FIGS. 6 and 7, the channel system 34 can again be seen respectively in parts in a schematic sectional view, namely in the region of a branching point 64, where one hollow body 36 divides into two further hollow bodies 36 or the gas flow is divided according to the arrows 65, 66.

Figure 8:
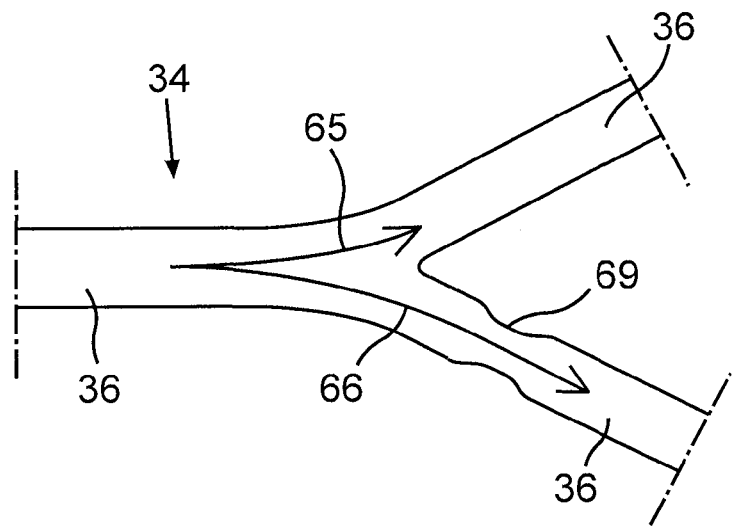
FIG. 8 is a further schematic sectional view and in parts through the channel system of the support structure analogous to FIG. 7, wherein the cross sectional change is presently only provided in a punctiform manner in the region of one of the two hollow bodies.

The special feature with the embodiments according to FIGS. 7 and 8 is that a cross sectional change 68, 69 is provided within the associated hollow body 36—in the present case a respective cross sectional reduction. While this cross sectional change 68 extends over the further length of the associated hollow body 36 in FIG. 7, the cross sectional change 69 according to FIG. 8 is only formed in a punctiform or partial manner according to the type of a throttle. It is however achieved in both cases that the flow resistance within the hollow bodies 36 can be adapted to the appropriate distribution of the gas flow (arrows 65, 66). An intended division of the gas flow results hereby, so as to correspondingly influence the filling time, the filling sequence and the deployment behavior of the airbag 28. These measures can also be used for influencing the flow and/or the pressure ratios in the hollow bodies 36, so as to for example cause or to avoid targeted constrictions, which can be caused by the Bernoulli effect.

Figure 9:
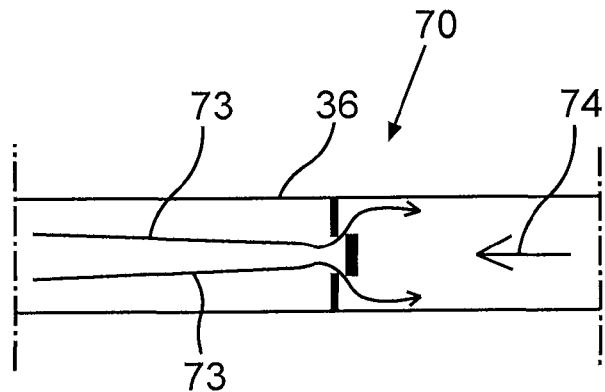
FIG. 9 is a schematic sectional view and in parts of a hollow body of the support structure with a valve formed as a check valve, by means of which a flow direction of the gas flow is to be adjusted.
Figure 10:
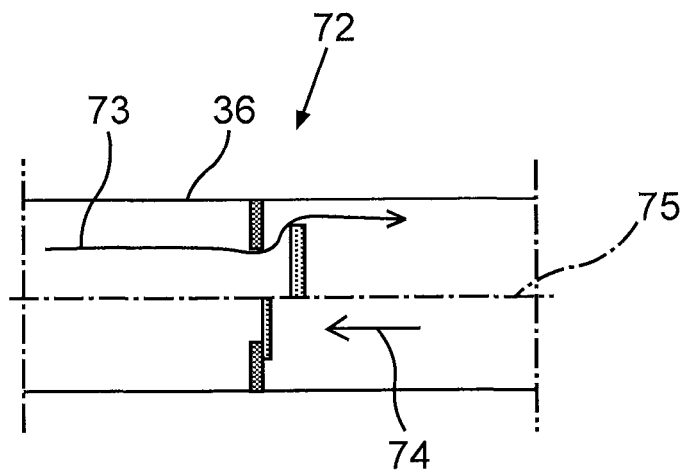
FIG. 10 is a further sectional view in parts of a hollow body of the channel system of the support structure with a differently designed check valve.

In FIGS. 9 and 10 is again shown one of the hollow bodies 36 of the channel system 34 of a respective sectional view in parts, in which respective means for the targeted influencing or interruption of the gas flow are provided. These means are respective valves 70, 72 in the present case, which function as check valves. If a gas flow accordingly flows in the direction indicated by the arrows 73 in the embodiment according to FIG. 9, the valve 70 is open. The check valve 70 is closed in the reverse direction—according to arrow 74. FIG. 10 shows a similar example of an effect, wherein the valve 72 is shown open above a center line 75 of the hollow body 36, and closed below the center line 75, depending in which direction the gas flow flows. By means of these valves 70, 72 or membranes, not only a complete closure of the respective hollow body 36 can be carried out, but different pressures can also be adjusted within the respective hollow bodies 36 or partial regions of the support structure 32. It is for example possible to use a part of the gas filling of the gas generator 46 for filling or heating the restraint volume 44, while the remaining part in the support structure 32 or the channel system 34 can be used for a restraining effect or for re-establishing the restraint volume 44. With a labyrinth and/or obstacle construction which can be represented thereby, the deployment sequence and speed can be controlled. The types of embodiments can also serve for generating nominal bend locations in the hollow bodies 36, via which the OoP behavior and the LRD behavior can be influenced in an advantageous manner.

By means of FIG. 4, it can further be seen that the deployment can also be influenced by rebound and/or draw straps 78, which extend through the restraint volume 44 and connect respective hollow bodies 36 of the support structure to each other. It is hereby for example possible to achieve a corresponding control of for example the deployment sequence and the deployment speed with a retarded ignition of a gas generator stage of the gas generator 46 in dependence on the deployment progress.

It can finally be seen in particular by means of FIG. 4, that a plurality of the hollow bodies 36 form an outer support structure 32, wherein at least one hollow body 82 indicated in a dashed manner is provided, with which the hollow bodies 36 of the outer structure 80 are connected to each other. The hollow body 82 thus passing through the restraint volume 44 enables to connect corresponding partial regions of the support structure 32 to each other in order to optimize the deployment and possibly also the support behavior of the airbag 28 hereby. In other words, at least one hollow body 82 is presently provided, which proceeds not only at the surface of the support structure 32, but also through the restraint volume 44. By this shortcut by means of the hollow body 82, an improved support and mutual stiffening of the hollow bodies 36 or of the support structure altogether can be achieved. By the system of crosslinked hollow bodies 36 or tube bodies, a distribution compound for improving the deployment with obstacles results, even if individual hollow bodies 36 are for example impeded during filling by a local obstacle. In this case can—if this is desired with the design of the support structure—at least parts of the support structure can still be filled further via bypasses (unhindered hollow bodies 36) instead of being blocked completely.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A support structure for a vehicle airbag which can be displaced from a storage position to a restraint position by means of a gas flow, said support structure comprising:
a plurality of tubular hollow bodies connected to each other, forming a channel system that surrounds a restraint volume, wherein the plurality of tubular hollow bodies are configured with respect to each other so that when the airbag is in a deployed position the tubular hollow bodies intersect each other to form a grid on at least three sides of the channel system and a first one of the plurality of tubular hollow bodies fluidly connects the grids of tubular hollow bodies on at least two of the three sides of the channel system by passing through the restraint volume, and
wherein at least one guide element is arranged within the channel system for guiding the gas flow,
wherein the guide element is provided at an intersection of two tubular hollow bodies of the channel system.

2. The support structure according to claim 1, wherein partial regions of the channel system have a different filling pressure of gas in the restraint position.

3. The support structure according to claim 1, at least one hollow body of the channel system has a nominal bending point.

4. The support structure according to claim 1, wherein:
an outer structure is formed by a plurality of said hollow bodies; and
at least one hollow body connects hollow bodies of the outer structure to each other.

5. The support structure according to claim 1, wherein a gas generator which generates the gas flow is connected to a plurality of hollow bodies.

6. A support structure for a vehicle airbag which can be displaced from a storage position to a restraint position by means of a gas flow, said support structure comprising:
a plurality of tubular hollow bodies connected to each other, forming a channel system that surrounds a restraint volume, wherein the plurality of tubular hollow bodies are configured with respect to each other so that when the airbag is in a deployed position the tubular hollow bodies intersect each other to form a grid on at least three sides of the channel system and a first one of the plurality of tubular hollow bodies fluidly connects the grids of tubular hollow bodies on at least two of the three sides of the channel system by passing through the restraint volume, and
wherein at least one of the tubular hollow bodies is configured to include a loop with a first end of the at least one of the tubular hollow bodies is configured to receive the gas flow and a second end of the at least one of the tubular hollow bodies includes closure element in the form of a flap, which is arranged within the channel system for closing the second end of the at least one of the tubular hollow bodies.

7. The support structure according to claim 6, wherein partial regions of the channel system have a different filling pressure of gas in the restraint position.

8. The support structure according to claim 6, at least one hollow body of the channel system has a nominal bending point.

9. The support structure according to claim 6, wherein:
an outer structure is formed by a plurality of said hollow bodies; and
at least one hollow body connects hollow bodies of the outer structure to each other.

10. The support structure according to claim 6, wherein a gas generator which generates the gas flow is connected to a plurality of hollow bodies.

11. A support structure for a vehicle airbag which can be displaced from a storage position to a restraint position by means of a gas flow, said support structure comprising:
a plurality of tubular hollow bodies connected to each other, forming a channel system that surrounds a restraint volume, wherein the plurality of tubular hollow bodies are configured with respect to each other so that when the airbag is in a deployed position the tubular hollow bodies intersect each other to form a grid on at least three sides of the channel system and a first one of the plurality of tubular hollow bodies fluidly connects the grids of tubular hollow bodies on at least two of the three sides of the channel system by passing through the restraint volume, and wherein a check valve is arranged within at least one of the tubular hollow bodies to adjust the gas flow.

12. The support structure according to claim 11, wherein partial regions of the channel system have a different filling pressure of gas in the restraint position.

13. The support structure according to claim 11, at least one hollow body of the channel system has a nominal bending point.

14. The support structure according to claim 11, wherein:
an outer structure is formed by a plurality of said hollow bodies; and
at least one hollow body connects hollow bodies of the outer structure to each other.

15. The support structure according to claim 11, wherein a gas generator which generates the gas flow is connected to a plurality of hollow bodies.

* * * * *